United States Patent
Hu et al.

(10) Patent No.: US 10,436,242 B2
(45) Date of Patent: Oct. 8, 2019

(54) TELESCOPIC TRANSMISSION ASSEMBLY AND LIFTING COLUMN USING SAME

(71) Applicant: ZHEJIANG JIECANG LINEAR MOTION TECHNOLOGY CO., LTD., Xinchang, Zhejiang (CN)

(72) Inventors: Renchang Hu, Zhejiang (CN); Xiaojian Lu, Zhejiang (CN); Zhanhui Huang, Zhejiang (CN); Donghang Zhang, Zhejiang (CN)

(73) Assignee: ZHEJIANG JIECANG LINEAR MOTION TECHNOLOGY CO., LTD., Xinchang, Zhejiang (CN)

( * ) Notice: Subject to any disclaimer, the term of this patent is extended or adjusted under 35 U.S.C. 154(b) by 211 days.

(21) Appl. No.: 15/639,005

(22) Filed: Jun. 30, 2017

(65) Prior Publication Data
US 2018/0172062 A1 Jun. 21, 2018

Related U.S. Application Data

(60) Provisional application No. 62/436,730, filed on Dec. 20, 2016.

(51) Int. Cl.
*F16B 7/10* (2006.01)
*F16C 1/28* (2006.01)
(Continued)

(52) U.S. Cl.
CPC ............ *F16C 1/28* (2013.01); *A47B 9/04* (2013.01); *B66F 3/10* (2013.01); *F16C 1/145* (2013.01);
(Continued)

(58) Field of Classification Search
CPC .. F16C 1/28; F16C 1/145; F16C 1/226; F16C 3/035; F16H 25/2018; F16H 25/2056;
(Continued)

(56) References Cited

U.S. PATENT DOCUMENTS 6,377,010 B1  4/2002 Roither
6,389,915 B1 * 5/2002 Wngett ................... B64C 13/00
                                                74/424.71
(Continued)

FOREIGN PATENT DOCUMENTS

DE    20210836 U1    11/2003
EP     2594157 A2     5/2013
FR     2747280 A1 * 10/1997 ............... A47B 9/04

OTHER PUBLICATIONS

European Patent Office (EPO), "European Search Report for 17 18 0690", Germany, Feb. 7, 2018.

*Primary Examiner* — Matthew R McMahon
(74) *Attorney, Agent, or Firm* — Tim Tingkang Xia, Esq.; Locke Lord LLP (57) ABSTRACT

A telescopic transmission assembly includes first and second stage rods, and first and second stage casings. The second stage rod is of a hollow structure having inner and outer surfaces and a through hole, the outer surface being provided with external threads, and the inner surface being devoid of threads. The first stage rod is disposed in the through hole to drive the second stage rod to rotate synchronously. The first and second stage rods are telescopically expandable or contractible relative to each other along an axial direction. The second stage casing sleeves over the first stage casing. The first and second stage casings have respectively first and second transmission nuts. The second and first stage rods are in a screw-thread fit with the first and second transmission nuts, respectively. The second stage rod is positioned with the first transmission nut in the axial direction in a rotatable manner.

11 Claims, 4 Drawing Sheets

(51) Int. Cl.
*F16C 3/035* (2006.01)
*F16C 1/22* (2006.01)
*F16C 1/14* (2006.01)
*A47B 9/04* (2006.01)
*H02K 5/24* (2006.01)
*H02K 7/116* (2006.01)
*F16H 25/20* (2006.01)
*H02K 7/06* (2006.01)
*B66F 3/10* (2006.01)

(52) U.S. Cl.
CPC .............. *F16C 1/226* (2013.01); *F16C 3/035* (2013.01); *F16H 25/2056* (2013.01); *H02K 5/24* (2013.01); *H02K 7/06* (2013.01); *H02K 7/1166* (2013.01); *A47B 2200/0056* (2013.01); *F16B 7/105* (2013.01); *F16H 25/2018* (2013.01); *F16H 2025/209* (2013.01)

(58) Field of Classification Search
CPC ....... F16H 2025/209; A47B 2200/0056; A47B 9/04; F16B 7/105; B66F 3/10; H02K 5/24; H02K 7/06; H02K 7/1166
See application file for complete search history.

(56) References Cited

U.S. PATENT DOCUMENTS

| | | | |
|---|---|---|---|
| 6,478,269 B2 * | 11/2002 | Forsberg | A47B 9/00 108/147.19 |
| 6,880,416 B2 | 4/2005 | Koch | |
| 7,495,359 B2 * | 2/2009 | Klinke | A47B 9/04 310/51 |
| 6,880,416 C1 | 8/2009 | Koch | |
| 9,018,813 B2 * | 4/2015 | Randlov | A47B 9/04 108/20 |
| 9,091,334 B2 * | 7/2015 | Kollreider | A47B 9/04 |
| 9,222,557 B2 * | 12/2015 | Wu | F16H 25/2056 |
| 9,723,916 B2 * | 8/2017 | Chen | A47B 9/04 |
| 9,759,296 B2 * | 9/2017 | Koch | F16H 25/12 |
| 10,094,456 B2 * | 10/2018 | Hu | F16H 25/20 |
| 2011/0174101 A1 | 7/2011 | Prottengeier et al. | |
| 2012/0227522 A1 | 9/2012 | Wu | |
| 2016/0047446 A1 * | 2/2016 | Hung | F16H 25/2056 74/89.35 |

* cited by examiner

TELESCOPIC TRANSMISSION ASSEMBLY AND LIFTING COLUMN USING SAME

CROSS-REFERENCE TO RELATED APPLICATION

This application claims priority to and the benefit of, pursuant to 35 U.S.C. § 119(e), U.S. provisional application Ser. No. 62/436,730, filed Dec. 20, 2016, which is incorporated herein in its entirety by reference.

FIELD OF THE INVENTION

The present invention relates generally to transmission apparatuses, and more particularly, to a telescopic transmission assembly and a lifting column using the same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

Electric lifting columns are widely applied to the fields such as home finishing, medical treatment and the like. A tube body of an existing electric lifting column generally includes an inner tube, a middle tube, and an outer tube which are successively sheathed from inside to outside, a housing fixedly connected with the upper end of the inner tube, a driving device arranged in the housing and a transmission assembly coupled with the driving device. In order to maximize a stroke of the electric lifting column, the transmission assembly generally includes a stage screw and a hollow screw with inner and outer threaded surface, which are assembled together so that the stage screw is screw-threaded into the hollow screw. Moreover, the inner tube and the middle tube are respectively provided with a transmission nut to be matched with the stage screw and the hollow screw, so that the relative extension of the inner tube, the middle tube and the outer tube is realized.

The transmission assembly may transfer the force onto the inner tube and the middle tube, thus causing extrusion among the inner tube, the middle tube and the outer tube, leading to transmission instability of the electric lifting column, and more seriously shortening the service life of the electric lifting column, in the case of non-uniform stress on the electric lifting column.

Therefore, a heretofore unaddressed need exists in the art to address the aforementioned deficiencies and inadequacies.

SUMMARY OF THE INVENTION

One of the objectives of this invention is to provide a telescopic transmission assembly and a lifting column using the same, so as to solve the technical problem of existing electric lifting columns.

In one aspect of the invention, the telescopic transmission assembly includes a first stage rod, a second stage rod, a first stage casing, and a second stage casing.

The second stage rod is formed in a hollow structure having an inner surface and an opposite, outer surface and a through hole defined by the inner surface. The outer surface is provided with external threads, and the inner surface is devoid of threads.

The first stage rod is disposed in the through hole of the second stage rod and adapted to drive the second stage rod to rotate synchronously, such that the first stage rod and the second stage rod are telescopically expandable or contractible relative to each other along an axial direction.

The first stage casing is provided with a first transmission nut. The external threads of the second stage rod is in a screw-thread fit with the first transmission nut.

The second stage casing sleeves over the first stage casing. The second stage casing is provided with a second transmission nut. The first stage rod is in a screw-thread fit with the second transmission nut. The second stage rod is positioned with the first transmission nut in the axial direction in a rotatable manner.

In one embodiment, the first stage rod has a driving end. The driving end is a non-cylindrical structure. The through hole of the second stage rod is a non-circular through hole. The non-cylindrical structure matches with the non-circular through hole so as to enable the first stage rod to transfer a driving force to the second stage rod.

In one embodiment, the upper end of the second stage rod is fixedly provided with a first bearing in a sheathing manner, and the first bearing is fixedly installed on the first transmission nut.

In one embodiment, both the first stage casing and the second stage casing are non-circular tubes machining with each other, the first transmission nut is clamped at the upper end of the first stage casing, and the second transmission nut is clamped at the upper end of the second stage casing.

In another aspect of the invention, the lifting column has the telescopic transmission assembly as claimed above.

In one embodiment, the lifting column according further comprises an inner tube, a middle tube, an outer tube, a housing fixedly connected onto an upper end of the inner tube, and a driving device arranged in the housing.

The telescopic transmission assembly is sheathed by the inner tube that is, in turn, sheathed by the middle tube that is, in turn, sheathed the outer tube.

The driving device is adapted to drive the telescopic transmission assembly. In one embodiment, the driving device is mechanically coupled with the first stage rod of the transmission assembly, a lower end of the outer tube is provided with a bottom plate, a lower end of the first stage casing of the telescopic transmission assembly abuts the bottom plate, and the second stage casing of the telescopic transmission assembly drives the middle tube to go up or down along the axial direction.

In one embodiment, the lower end of the second stage casing of the telescopic transmission assembly is connected with a fixed block, the fixed block has a protruding edge extending along the radial direction, and the protruding edge is disposed underneath a tube wall of the middle tube.

In one embodiment, the driving device comprises a motor having an output shaft, a worm connected onto the output shaft of the motor, a case fixed at an outer shell of the motor, and a worm gear arranged in the case. The worm extends into the case to mesh with the worm gear, the worm gear is provided with an upper specially-shaped hole. The first stage rod of the telescopic transmission assembly has an input end.

The input end is configured as a specially-shaped rod body. The specially-shaped rod body successively penetrates through the housing and the case to be matched with the specially-shaped hole.

In one embodiment, a second bearing and a third bearing are installed in the case. The upper end surface and the lower end surface of the worm gear are respectively provided with a protruding bearing position. The second bearing is installed on one bearing position, the third bearing is installed on the other bearing position. The specially-shaped hole is configured to penetrate through the two bearing positions.

In one embodiment, a fixed plate and a rubber mat are arranged in the housing. The fixed plate is disposed below the case. The rubber mat is disposed below the fixed plate or the rubber mats are disposed both between the fixed plate and the case and below each fixed plate. The case, the fixed plate and the rubber mats are locked at the housing through bolts.

In one embodiment, the first stage rod is provided with a fourth bearing in a sheathing manner. The fourth bearing is disposed below the driving end. The upper end of the fixed plate is provided with a groove for accommodating the fourth bearing.

In one embodiment, the first stage rod is provided with a mounting seat in a sheathing manner. The mounting seat is disposed below the fixed plate, the mounting seat is provided with a torsion spring in a sheathing manner. The torsion spring has a pin, and the pin is clamped with the fixed plate.

In one embodiment, the lower end of the first stage casing is provided with an end cover. The end cover is clamped at the lower end of the first stage casing. The end cover is fixedly connected with the bottom plate through a bolt.

According to the present invention, the telescopic transmission assembly and the lifting column have, among other things, the beneficial effects as follows:

The first stage rod in the transmission assembly of the present invention can drive the second stage rod to rotate synchronously. In this process, the first stage rod drives the first stage casing to make linear movement through the first transmission nut. Meanwhile, the second stage rod moves along with the first transmission nut to enable the first stage rod and the second stage rod to be stretchable relative to each other along the axial direction, and the second stage rod drives the second stage casing to make linear movement through the second transmission nut when in rotation. Thus, a driving force generated by the first stage rod and the second stage rod is applied to the first stage casing and the second stage casing. After the transmission assembly is installed at the lifting column, the inner tube, the middle tube and the outer tube of the lifting column can be only subjected to the driving force in the axial direction. Therefore, the inner tube, the middle tube and the outer tube of the lifting column may not produce a radial extrusion force, the lifting of the lifting column can be very stable, the noise in the lifting process is remarkably reduced, and the lifting column can have a longer service life.

In addition, by installing the first bearing sleeved over the upper portion of the second stage rod on the first transmission nut, the second stage rod and the first transmission nut are positioned in the axial direction, so that the synchronous extending or retreating of the second stage rod and the first stage casing is realized. Moreover, the supporting effect of the first transmission nut can ensure that the second stage rod rotates more stably, and a mounting structure of the first bearing and the first transmission nut is compacter.

Further, since both the first stage casing and the second stage casing are non-circular tubes, a rotating force applied by the first stage rod and the second stage rod onto the first stage casing and the second stage casing during the transmission process can be effectively balanced, so that the drive process of the transmission assembly is more stable and reliable. The first transmission nut and the first stage casing as well as the second transmission nut and the second stage casing are installed in a clamping manner, so that the structural strength, the reliability and the production assembling efficiency can be greatly improved compared to a threading installation way. Furthermore, if both the first stage casing and the second stage casing employ circular tube structures, the first transmission nut and the second transmission nut are generally fixedly installed in a threading connection manner, this installation way is likely to cause the loosening of the first transmission nut and the second transmission nut during the rotation process of the first stage rod and the second stage rod, but this influence can be avoided if the first stage casing and the second stage casing employ the non-circular tube structures, ensuring the installation of the first transmission nut and the second transmission nut to be more reliable and stable.

Moreover, the lifting column of the present invention adopts the transmission assembly having the above-mentioned advantages, the outer wall of the lower portion of the second stage casing is provided with the fixed block, the middle tube is driven by the protruding edge of the fixed block, and the lower portion of the second stage casing pushes the bottom plate of the outer tube so as to lift the inner tube, so that the structure is very compact. Moreover, the force is transferred in the axial direction, so that the transmission reliability is greatly improved; therefore, in the stretching process of the lifting column, the inner tube, the middle tube and the outer tube are only subjected to the axial force, no radial force is produced, and the mutual extrusion problem of the inner tube, the middle tube and the outer tube is avoided.

For the driving device employed by the lifting column of the present invention, the motor, the case and the worm gear can be installed into the housing after being assembled in advance, so that the production efficiency of the lifting column is greatly improved. In addition, the power transferring is implemented through the specially-shaped hole arranged on the worm gear and the specially-shaped rod body arranged on the first stage rod, so that a drive connection part is maximally simplified, and the power transferring reliability is remarkably improved.

The upper portion and the lower portion of the worm gear in the driving device are respectively fixed by the second bearing and the third bearing, so that a higher transmission efficiency can be achieved, and the drive performance is more stable.

The rubber mat is arranged between the fixed plate and the housing, so that the connection between the case of the driving device and the housing is soft connection; therefore, the case of the driving device allows slight angular adjustment, an assembling concentricity error and an assembling error of the driving device and the housing as well as a linearity error of the first stage rod can be effectively balanced, the stress concentration is avoided, the transmission reliability of the lifting column is greatly improved, and the resonance noise produced between the driving device and the housing is further effectively reduced.

By installing the fourth bearing sleeved over the upper portion of the first stage rod on the fixed plate, the first stage rod and the fixed plate are positioned in the axial direction, so that more stability in rotation of the first stage rod can be guaranteed, and the installation structure of the fourth bearing and the fixed plate is compacter; more importantly, in process for installing the case of the driving device, the fixed plate and the rubber mat at the housing through the bolts, the fourth bearing can also be tightly pressed by the case, so that the assembling process of the lifting column can be simplified, and the production efficiency can be improved.

Since the first stage rod is provided with the mounting seat and the torsion spring, the torsion spring is clamped with the fixed plate through the pin, and the torsion spring can apply a torsion force to the first stage rod in the descending process of the lifting column, so that a self-locking function of the first stage rod when no power is inputted can be realized.

The lower end of the first stage casing and the bottom plate are tightened by bolts through the end cover, so that the process in which the first stage casing applies the driving force to the outer tube is more stable and reliable; moreover, the end cover is fixed onto the first stage casing without a screw in a riveting manner, so that the structural strength, the reliability and the production assembling efficiency are greatly improved.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The description will be made as to the embodiments of the present disclosure in conjunction with the accompanying drawings. In accordance with the purposes of this disclosure, as embodied and broadly described herein, this disclosure, in one aspect, relates to a telescopic transmission assembly and a lifting column using the same.

Figure 1:
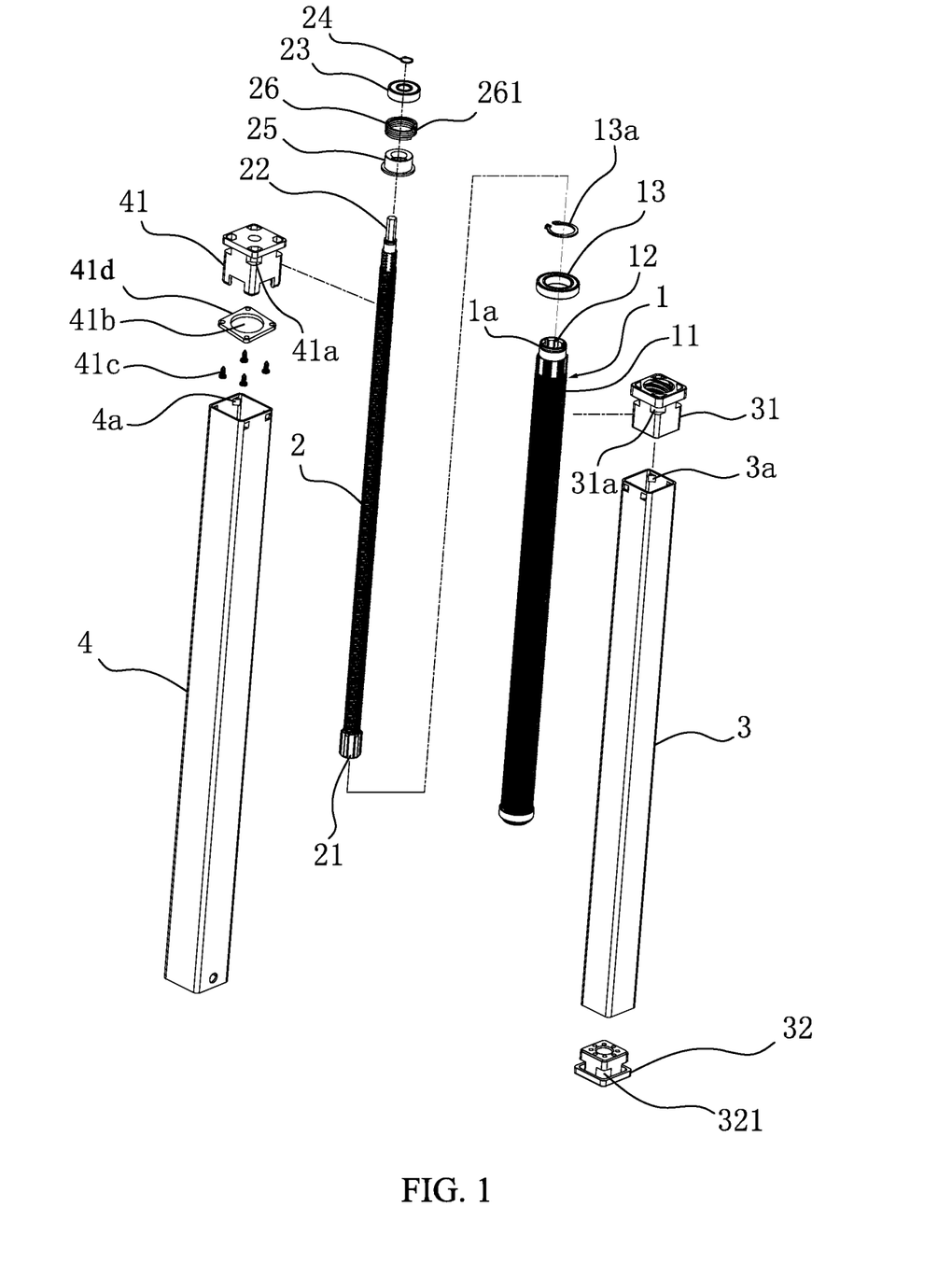
FIG. 1 is an exploded schematic view of a transmission assembly according to one embodiment of the present invention.

As shown in FIG. 1, a telescopic transmission assembly includes a first stage rod 2, a second stage rod 1, a first stage casing 3 and a second stage casing 4. The second stage rod 1 is formed in a hollow structure having an inner surface and an opposite, outer surface and a through hole defined by the inner surface. The outer surface of the second stage rod 1 is provided with external threads 11, while the inner surface of the second stage rod 1 is devoid of threads. The through hole of the second stage rod 1 is of a non-circular through hole, i.e., the cross-sectional shape of the through hole in a section (plan) perpendicular to an axis of the second stage rod 1 is of a non-circular shape.

The first stage rod 2 is disposed in the through hole of the second stage rod 1. The first stage rod 2 includes a driving end, where the driving end is of a non-cylindrical structure. The non-cylindrical structure of the driving end of the first stage rod 2 is matched with the non-circular through hole of the second stage rod 1 so as to enable the first stage rod 2 to transfer a driving force to the second stage rod 1 to drive the second stage rod 1 to rotate synchronously.

In the exemplary embodiment, the non-cylindrical structure of the driving end of the first stage rod 2 is disposed at the bottom end of the first stage rod 2 and includes a spline shaft 21, and a plurality of slots 12 is formed on the inner surface of the second stage rod 1 along the lengthwise (axial) direction of the second stage rod 1. The spline shaft 21 and the slots 12 are matched in a clamping manner so as to implement the power transferring between the first stage rod 2 and the second stage rod 1.

In some embodiments, the non-cylindrical structure and the non-circular through hole are not limited to these structures discussed above, and may also include respectively a D-shaped shaft and a D-shaped through hole matching the D-shaped shaft, a polygonal shaft and a polygonal hole matching the polygonal shaft, and the like. All of other non-cylindrical structures and non-circular through holes matching the non-cylindrical structures, which can transfer the rotation force of the first stage rod 2 to that of the second stage rod 1, can be used to practice this invention. Thus, the specific structures are not exhaustively listed herewith in the present disclosure.

An upper portion of the first stage casing 3 is connected with a first transmission nut 31 that is internally threaded. The external threads 11 of the second stage rod 1 operably mesh or are in a screw-thread fit with the internal threads of the first transmission nut 31. As assembled, the first stage casing 3 is sleeved by the second stage casing 4. An upper portion of the second stage casing 4 is connected with a second transmission nut 41. The first stage rod 2 has external threads on its outer surface, which operably mesh or are in a screw-thread fit with the second transmission nut 41. The second stage rod 1 is positioned with the first transmission nut 41 in the axial direction in a rotatable manner, that is, the second stage rod 1 can rotate relative to the first transmission nut 41 but cannot move relative to the first transmission nut 41 in the axial direction.

The upper end of the second stage rod 1 is fixedly provided with a first bearing 13 in a sheathing manner, and the first bearing 13 is fixedly installed on the first transmission nut 31. In one embodiment, a specific installation/assembly structure is as follows: the upper end axial surface of the second stage rod 1 is provided with a groove 1a, the groove 1a is disposed above the first bearing 13, a circlip 13a is embedded into the groove 1a, and the circlip 13a prevents the first bearing 13 from being separated from the second stage rod 1. Furthermore, the lower end of the first transmission nut 31 is provided with a groove for installing the first bearing 13. A mounting piece 41d is arranged below the first transmission nut 31, and the mounting piece 41d is disposed below the first bearing 13. The mounting piece 41d has a through hole 41b through which the second stage rod 1 to pass. After the first bearing 13 is installed into the groove of the first transmission nut 31, the mounting piece 41d is fixedly connected with the lower end of the first transmission nut 31 through bolts 41c, then the mounting piece 41d forms an accommodating space for installing the first bearing 13 with the groove of the first transmission nut 31. The mounting piece 41d is served as a supporting plate of the first bearing 13.

Both the first stage casing 3 and the second stage casing 4 are non-circular tubes machining with each other. In one embodiment, both the first stage casing 3 and the second stage casing 4 are square tubes. In some embodiments, the first stage casing 3 and the second stage casing 4 can also be the non-circular tubes of other shapes. The first transmission nut 31 is clamped at the upper end of the first stage casing 3, while the second transmission nut 41 is clamped at the upper end of the second stage casing 4. In one embodiment, a specific clamping structure is employed as follows: the inner wall of an upper portion of the first stage casing 3 is provided with buckles 3a, the inner wall of an upper portion of the second stage casing 4 is provided with buckles 4a, the lower end of the first transmission nut 31 is provided with engagement slots 31a, and the lower end of the second transmission nut 41 is provided with engagement slots 41a. As assembled, the first transmission nut 31 is pressed into the first stage casing 3 in a riveting manner to enable the buckles 3a and the engagement slots 31a to be in a clamping fit with each other. Similarly, the second transmission nut 41 is pressed into the second stage casing 4 in a riveting manner to enable the buckles 4a and the engagement slots 41a to be in a clamping fit with each other. It should be noted that the positions of the buckles 3a and the engagement slots 31a, and the positions of the buckles 4a and the engagement slots 41a can be exchanged, that is, the inner wall of the upper portion of the first stage casing 3 and the inner wall of the upper portion of the second stage casing 4 can be provided with the engagement slots, and correspondingly, the first transmission nut 31 and the second transmission nut 41 can be provided with the buckles, thus can also realize the above-mentioned clamping function. In one embodiment, the riveting manner refers to that the first transmission nut 31 is pressed into the first stage casing 3, and the second transmission nut 41 is pressed into the second stage casing 4 by means of the mechanical pressure. In this assembling process, the buckles 3a and the buckles 4a are firstly deformed, then the buckles 3a are partially or completely restored to be clamped into the engagement slots 31a, and the buckles 4a are partially or completely restored to be clamped into the engagement slots 41a, so that the screw-free assembling of the first transmission nut 31 and the first stage casing 3 as well as the screw-free assembling of the second transmission nut 41 and the second stage casing 4 can be realized. It should be noted that the first transmission nut 31 and the second transmission nut 41 adopt the non-circular nuts matched with the first stage casing 3 and the second stage casing 4, since the first stage casing 3 and the second stage casing 4 are non-circular tubes and preferably adopt the square tubes, correspondingly, the first transmission nut 31 and the second transmission nut 41 also preferably adopt a cubic shape matched with the square tube.

Figure 2:
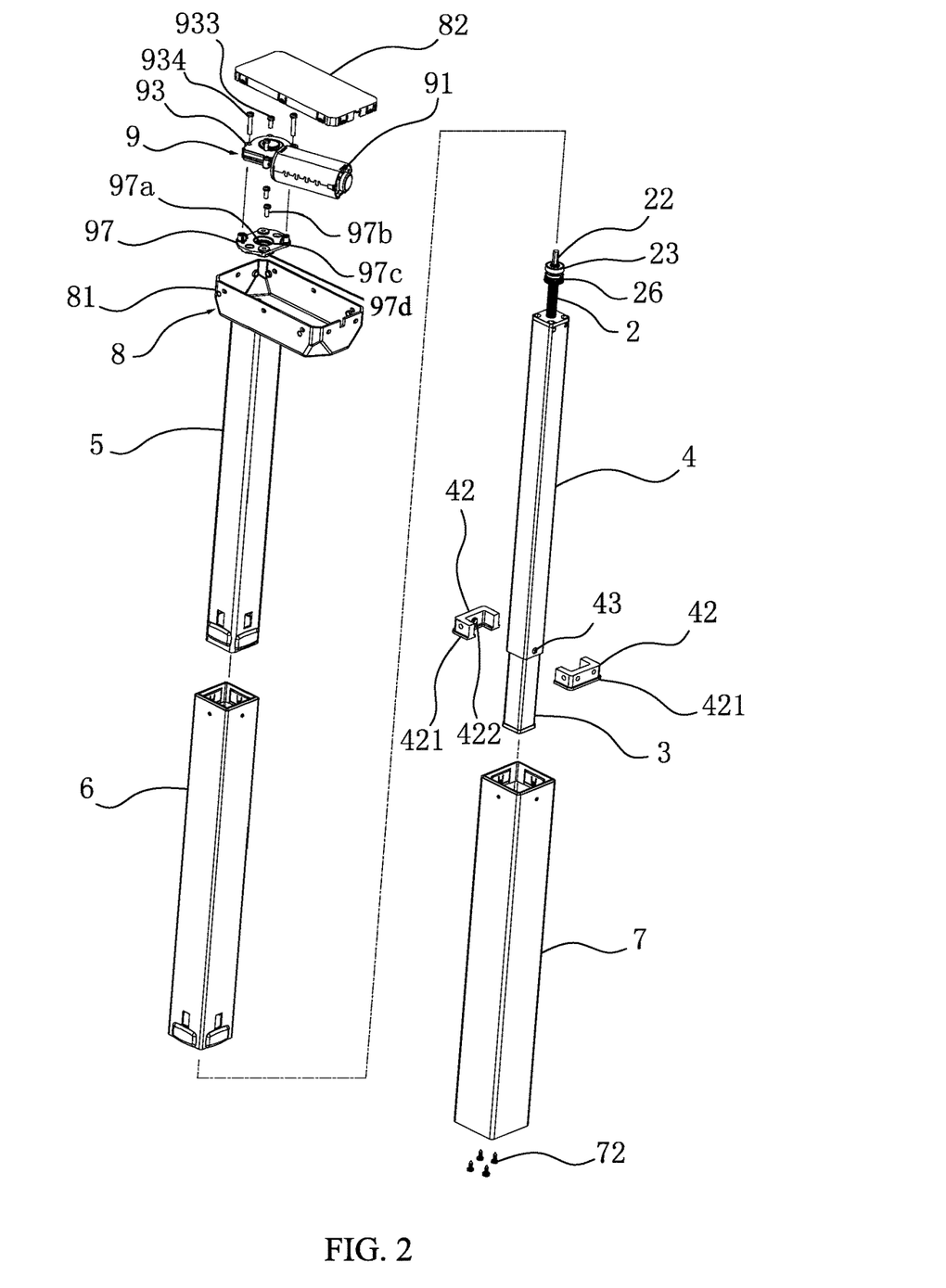
FIG. 2 is an exploded schematic view of a lifting column according to one embodiment of the present invention.
Figure 3:
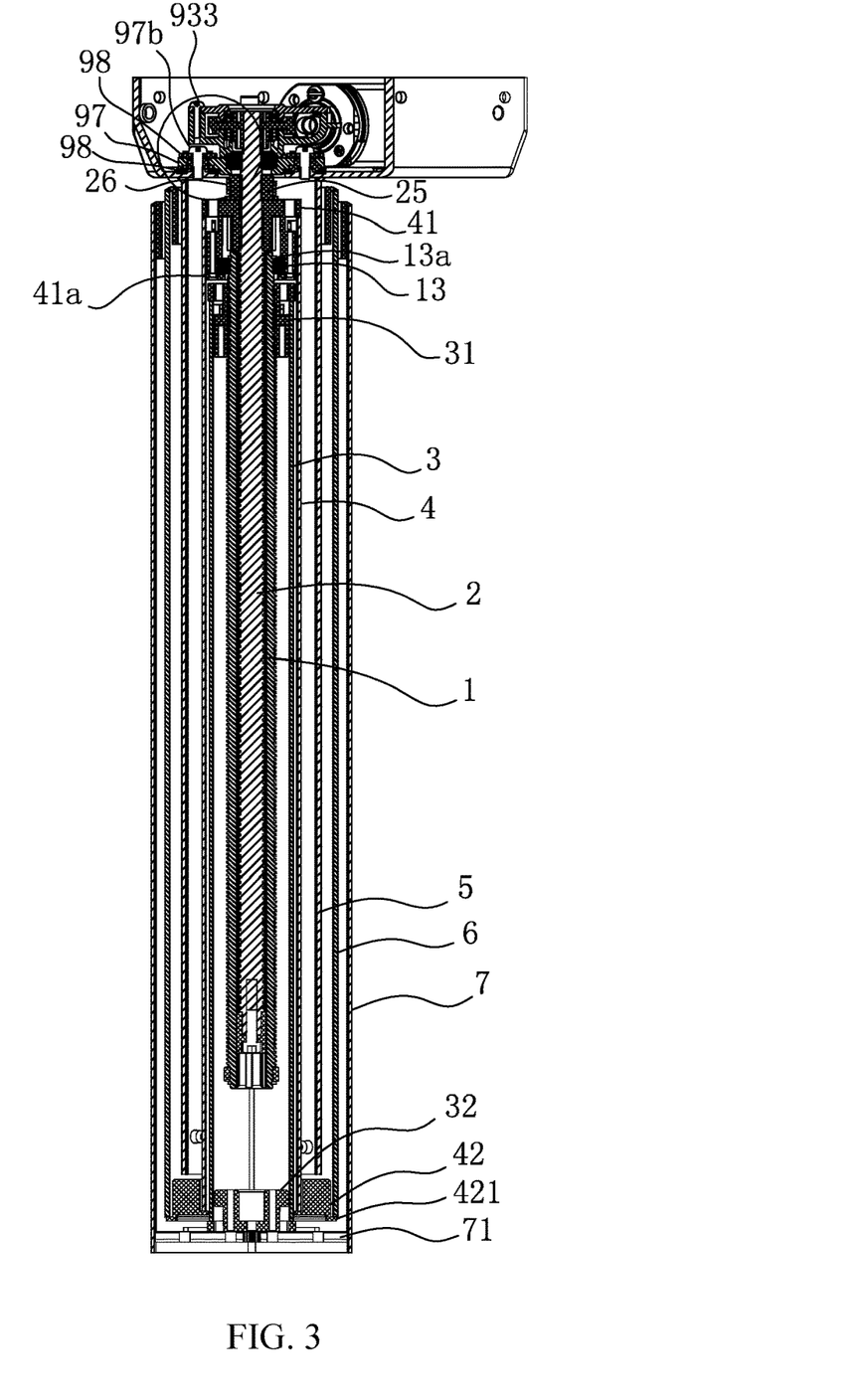
FIG. 3 is sectional view of the lifting column according to one embodiment of the present invention.

As shown in FIGS. 1-3, a lifting column includes an inner tube 5, a middle tube 6, and an outer tube 7 which are successively sheathed from inside to outside, a housing 8 fixedly connected with the upper end of the inner tube 5, a driving device 9 arranged in the housing 8 and a transmission assembly operably coupling with the driving device 9, where the transmission assembly is the transmission assembly described above. The housing 8 includes a box body 81 and a box cover 82. The box cover 82 is buckled with an opening of the box body 81 to enable the housing 8 to have an accommodating space for accommodating the driving device 9. The driving device 9 is coupled with the upper end of the first stage rod 2. The lower end of the outer tube 7 is provided with a bottom plate 71. The lower end of the first stage casing 3 abuts the bottom plate 71. The second stage casing 4 drives the middle tube 6 to go up and down.

In one embodiment, the solution in which the second stage casing 4 drives the middle tube 6 to go up and down is as follows: the outer wall of the lower portion of the second stage casing 4 is provided with a fixed blocks 42, the fixed block 42 has a protruding edge 421 extending outwards, and the protruding edge 421 is disposed below the wall of the middle tube 6. In one embodiment, for the convenience of installing the fixed blocks 42, the fixed blocks 42 are divided into two pieces. The inner surface, which contacts the outer wall of the second stage casing 4, of the fixed block 42 is provided with a protruding column 422, and the outer wall of the second stage casing 4 is provided with a through hole 43. The two pieces of fixed block 42 is fixedly installed on the outer wall of the second stage casing 4 by stretching the protruding column 422 into the through hole 43. As such, when the second stage casing 4 is lifted, the middle tube 6 can be lifted through the protruding edge 421, when the second stage casing 4 descends, the middle tube 6 automatically descends due to the gravity effect. This structure has the advantage that the assembling of the fixed block 42 is relatively simple and convenient, and the middle tube 6 does not need to be assembled particularly with the fixed block 42. It should be noted that the lower end of the second stage casing 4 can also fixedly be connected with the lower end of the middle tube 6, thereby also achieving a purpose of driving the middle tube 6 to go up and down by the second stage casing 4.

In one embodiment, an operating process of the lifting column is as follows: the driving device 9 drives the first stage rod 2 and the second stage rod 1 to rotate synchronously. The first stage rod 2 drives the first transmission nut 31 and the first stage casing 3 to synchronously move linearly. Since the second stage rod 1 and the first transmission nut 31 are positioned in the axial direction, the second stage rod 1 follows the first transmission nut 31 to move linearly when in rotation. Therefore, the spline shaft 21 of the second stage rod 1 slides along the slots 12 in the through hole of the second stage rod 1. The rotation of the second stage rod 1 drives the second transmission nut 41 and the second stage casing 4 to synchronously move linearly, so that the synchronous expansion or contraction of the first stage casing 3 and the second stage casing 4 is realized. When the first stage casing 3 makes the linear movement, the bottom end of the first stage casing 3 applies a push force to the bottom plate 71, the bottom end of the outer tube 7 of the lifting column is connected with a column supporting leg when in use. The column supporting leg is supported on the ground, therefore, the first stage rod 2 may drive the housing to rise or descend. When the second stage casing 4 makes the linear rising movement, the second stage casing 4 drives the middle tube 6 to rise together through the protruding edge 421, when the second stage casing 4 makes the linear descending movement, the middle tube 6 automatically descends to be retracted due to the gravity effect, and in this way, an effect of keeping the outer tube 7 stationary and synchronously lifting the inner tube 5 and the middle tube 6 is realized.

As shown in FIGS. 2-5, in one embodiment, the driving device 9 includes a motor 91, a worm 92 connected onto an output shaft of the motor 91, a case 93 fixed on an outer shell of the motor 91 at its power output end, and a worm gear 94 arranged in the case 93. The worm 92 extends into the case 93 to mesh with the worm gear 94. The worm gear 94 is provided with a specially-shaped hole 941. The first stage rod 2 has an input end, and the input end is configured as a specially-shaped rod body 22 matching with the specially-shaped hole 941. The specially-shaped rod body 22 penetrates through the box body 81 and the case 93 to match with the specially-shaped hole 941. The special shape of the specially-shaped hole 941 and the specially-shaped rod body 22 refers to a non-cylindrical structure. In one embodiment, the specially-shaped hole 941 is a hexagonal hole, while the specially-shaped rod body 22 is a hexagonal rod matching with the hexagonal hole. It should be noted that the specially-shaped hole 941 and the specially-shaped rod body 22 may also be other polygonal specially-shaped structure. All other specially-shaped holes 941 and specially-shaped rod bodies 22 matching with specially-shaped holes 941, which can realize power transferring, can be implemented in the invention. Furthermore, the case 93 includes an upper case 931 and a lower case 932. The upper case 931 and the lower case 932 are fixedly installed through a bolt 933. The upper case 931 or the lower case 932 is fixedly connected with the outer shell of the motor 91 and may also be integrally molded, so that the driving device 9 can be independently assembled prior to the assembly of the lifting column, and can be installed into the housing 8 as an integral part, and the motor 91 and the worm gear 94 do not need to be separately installed into the housing 8. Therefore, the assembling efficiency of the lifting column is greatly improved.

Figure 4:
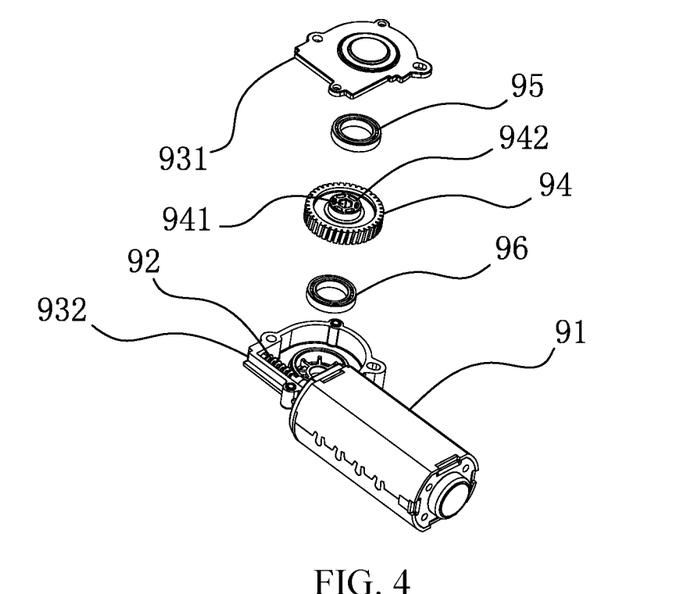
FIG. 4 is an exploded view of a driving device according to one embodiment of the present invention.

In order to improve the transmission efficiency of the worm gear 94, as shown in FIG. 4, a second bearing 95 and a third bearing 96 are installed in the case 93, the second bearing 95 is clamped onto the upper case 931, the third bearing 96 is clamping onto the lower case 932, two end surfaces of the worm gear 94 are respectively provided with a bearing position 942, the upper bearing position 942 is assembled with the second bearing 95, and the lower bearing position is assembled with the third bearing 96.

Figure 5:
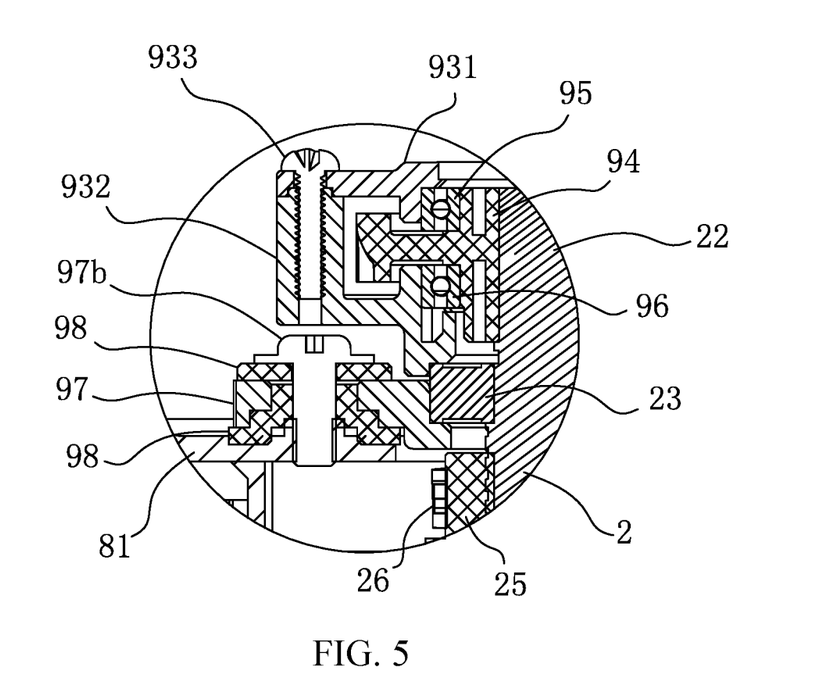
FIG. 5 is a detail view of a region A in FIG. 3.

As shown in FIGS. 3 and 5, a fixed plate 97 and a rubber mat 98 are arranged in the housing 8. The fixed plate 97 is disposed below the case 93, and the rubber mat 98 is disposed below the fixed plate 97 to play a role in eliminating the vibration of the fixed plate 97. However, in order to further improve the damping effect of the rubber mat, in one embodiment, a rubber mat 98 is also arranged between the fixed plate 97 and the case 93, and both the fixed plate 97 and the rubber mats 98 have through holes 97a through which the first stage rod 2 pass. The case 93, the fixed plate 97 and the rubber mats 98 are locked at the housing 8 through bolts. The case 93, the fixed plate 97 and the rubber mats 98 are tightly pressed onto the inner bottom surface of the box body 81 of the housing 8 by enabling the bolts 934 to successively penetrate through the case 93, the fixed plate 97 and the rubber mats 98 from top to bottom to be in thread connection with the inner bottom surface of the box body 81 of the housing 8. In order to improve the installation reliability of the fixed plate 97, the fixed plate 97 is also fixed on the inner bottom surface of the box body 81 of the housing 8 through a fixed plate bolt 97b, the bolts 934 are used as locking members to press the case 93, the fixed plate 97 and the rubber mats 98 and are also used as connecting members to assemble the upper case 931 and the lower case 932.

As shown in FIGS. 1-3 and 5, in the exemplary embodiment, the first stage rod 2 is provided with a fourth bearing 23 in a sheathing manner, the fourth bearing 23 is disposed below the driving end of the first stage rod 2, the upper end of the fixed plate 97 is provided with a groove 97c for accommodating the fourth bearing 23, and the fourth bearing 23 is tightly pressed at the bottom surface of the groove 97c by the lower case 932 of the case 93, and a circlip 24 is adapted to prevent the fourth bearing 23 from being separated from the first stage rod 2.

In the case where the first stage rod 2 has no power input, the first stage rod 2 having a self-locking function may be safer; in order to realize the self-locking function of the first stage rod 2, the first stage rod 2 is provided with a mounting seat 25 in a sheathing manner, the mounting seat 25 is provided with a torsion spring 26 in a sheathing manner, the torsion spring 26 has a pin 261, the pin 261 is clamped with the fixed plate 97. The specific assembling structure is as follows: the fixed plate 97 has a protruding portion 97d protruding downwards, the protruding portion 97d penetrates through the box body 81 of the housing 8, the pin 261 is clamped with the protruding portion 97d, the first stage rod 2 drives the mounting seat 25 and the torsion spring 26 to rotate, when the first stage rod 2 makes the rising movement, the rotation enables the torsion spring 26 to release the mounting seat 25; when the first stage rod 2 makes a descending movement, the rotation enables the torsion spring 26 to tightly hold the mounting seat 25, that is to say, the torsion spring 26 can prevent the lifting column from descending suddenly in the case where the first stage rod 2 has no power input, thereby implementing the self-locking function of the first stage rod 2.

The lower end of the first stage casing 3 is provided with an end cover 32, the end cover 32 is clamped at the lower end of the first stage casing 3, and a clamping structure and a riveting assembling way as described above are specifically adopted, that is to say, the inner wall of the lower end of the first stage casing 3 is provided with buckles, the outer wall of the end cover 32 is provided with engagement slots 321, the end cover 32 is pressed into an opening at the lower end of the first stage casing 3 under the mechanical pressure, thereby realizing the clamping of the buckles and the engagement slots 321; and of course, the outer wall of the end cover 32 may also be provided with the buckles, and the inner wall of the lower end of the first stage casing 3 may be correspondingly provided with the engagement slots, thus can also realize the clamping of the end cover 32 and the first stage casing 3. Finally, the end cover 32 is fixedly connected with the bottom plate 71 through bolts 72.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:
1. A lifting column, comprising:
a telescopic transmission assembly, comprising:
 a first stage rod, a second stage rod, a first stage casing, and a second stage casing,
 wherein the second stage rod is formed in a hollow structure having an inner surface and an opposite, outer surface and a through hole defined by the inner surface, the outer surface being provided with external threads, and the inner surface being devoid of threads;
 wherein the first stage rod is disposed in the through hole of the second stage rod and adapted to drive the second stage rod to rotate synchronously, such that the first stage rod and the second stage rod are telescopically expandable or contractible relative to each other along an axial direction;
 wherein the first stage casing is provided with a first transmission nut, the external threads of the second stage rod being in a screw-thread fit with the first transmission nut; and
 wherein the second stage casing sleeves over the first stage casing, the second stage casing being provided with a second transmission nut, the first stage rod being in a screw-thread fit with the second transmission nut, and the second stage rod being positioned with the first transmission nut in the axial direction in a rotatable manner; and
an inner tube, a middle tube, an outer tube, a housing fixedly connected onto an upper end of the inner tube, and a driving device arranged in the housing,
wherein the telescopic transmission assembly is sheathed by the inner tube that is, in turn, sheathed by the middle tube that is, in turn, sheathed by the outer tube; and
wherein the driving device is adapted to drive the telescopic transmission assembly, wherein the driving device is mechanically coupled with the first stage rod of the transmission assembly, a lower end of the outer tube is provided with a bottom plate, a lower end of the first stage casing of the telescopic transmission assembly abuts the bottom plate, and the second stage casing of the telescopic transmission assembly drives the middle tube to go up or down along the axial direction.
2. The lifting column according to claim 1, wherein the lower end of the second stage casing of the telescopic transmission assembly is connected with a fixed block, the fixed block has a protruding edge extending along a radial direction, and the protruding edge is disposed underneath a tube wall of the middle tube.

3. The lifting column according to claim 1, wherein the driving device comprises a motor having an output shaft, a worm connected onto the output shaft of the motor, a case fixed at an outer shell of the motor, and a worm gear arranged in the case, wherein the worm extends into the case to mesh with the worm gear, the worm gear is provided with an upper specially-shaped hole, the first stage rod of the telescopic transmission assembly has an input end, the input end is configured as a specially-shaped rod body, and the specially-shaped rod body successively penetrates through the housing and the case to be matched with the specially-shaped hole.

4. The lifting column according to claim 3, wherein a second bearing and a third bearing are installed in the case, the upper end surface and the lower end surface of the worm gear are respectively provided with a protruding bearing position, the second bearing is installed on one bearing position, the third bearing is installed on the other bearing position, and the specially-shaped hole is configured to penetrate through the two bearing positions.

5. The lifting column according to claim 3, wherein a fixed plate and at least one rubber mat are arranged in the housing, the fixed plate is disposed below the case, the at least one rubber mat is disposed below the fixed plate or the at least one rubber mat is disposed both between the fixed plate and the case and below the fixed plate, and wherein the case, the fixed plate and the at least one rubber mat are locked at the housing through bolts.

6. The lifting column according to claim 5, wherein the first stage rod is provided with a fourth bearing in a sheathing manner, the fourth bearing is disposed below a driving end of the first stage rod, and the upper end of the fixed plate is provided with a groove for accommodating the fourth bearing.

7. The lifting column according to claim 5, wherein the first stage rod is provided with a mounting seat in a sheathing manner, the mounting seat is disposed below the fixed plate, the mounting seat is provided with a torsion spring in a sheathing manner, the torsion spring has a pin, and the pin is clamped with the fixed plate.

8. The lifting column according to claim 1, wherein the lower end of the first stage casing is provided with an end cover, the end cover is clamped at the lower end of the first stage casing, and the end cover is fixedly connected with the bottom plate through a bolt.

9. The lifting column according to claim 1, wherein the first stage rod has a driving end, the driving end is a non-cylindrical structure, the through hole of the second stage rod is a non-circular through hole, and the non-cylindrical structure matches with the non-circular through hole so as to enable the first stage rod to transfer a driving force to the second stage rod.

10. The lifting column according to claim 1, wherein the upper end of the second stage rod is fixedly provided with a first bearing in a sheathing manner, and the first bearing is fixedly installed on the first transmission nut.

11. The lifting column according to claim 1, wherein both the first stage casing and the second stage casing are non-circular tubes matching with each other, the first transmission nut is clamped at the upper end of the first stage casing, and the second transmission nut is clamped at the upper end of the second stage casing.

* * * * *